United States Patent [19]
Cuneo

[11] Patent Number: 5,090,499
[45] Date of Patent: Feb. 25, 1992

[54] DUST EXTRACTION FOR DRILL

[75] Inventor: Giuseppe L. Cuneo, Bergamo, Italy

[73] Assignee: Black & Decker Inc., Newark, Del.

[21] Appl. No.: 629,368

[22] Filed: Dec. 18, 1990

[30] Foreign Application Priority Data

Dec. 22, 1989 [IT] Italy .................. 22828 A/89

[51] Int. Cl.⁵ .................. B25D 17/14; E21C 7/02
[52] U.S. Cl. .................. 175/209; 173/75
[58] Field of Search .................. 175/209, 211; 173/32, 173/33, 75; 51/273; 15/347

[56] References Cited

U.S. PATENT DOCUMENTS

| | | | |
|---|---|---|---|
| 3,103,069 | 9/1963 | Gary | 51/273 X |
| 3,256,944 | 6/1966 | Holzapfel | 173/75 |
| 3,490,779 | 1/1970 | Bixby | |
| 3,511,322 | 5/1970 | Bixby et al. | 173/75 |
| 3,850,254 | 11/1974 | Hirdes | 173/75 |
| 4,097,176 | 6/1978 | Wanner et al. | 408/56 |
| 4,192,390 | 3/1980 | Wanner et al. | 173/75 |
| 4,205,728 | 6/1980 | Gloor et al. | 175/209 |
| 4,207,953 | 6/1980 | Reibetanz et al. | 175/209 |
| 4,209,069 | 6/1980 | Smith | 173/75 |
| 4,250,971 | 2/1981 | Reibetanz et al. | 175/209 X |

Primary Examiner—Terry Lee Melius
Attorney, Agent, or Firm—Dennis A. Dearing; Charles E. Yocum; Edward D. C. Bartlett

[57] ABSTRACT

A device for sucking up material removed by the bit of a portable drill is made in the form of a casing provided with means for securing it to the drill and having at least one portion constituting a handle to enable it to be gripped in one hand by the operator. The device comprises a suction head fitted slidingly on the casing to enable it to be kept close to the point of penetration into the surface of a body to be drilled by the bit fitted on the drill. Disposed inside the casing of the device are a fan with intake connected to said head through a connecting duct and with outlet blowing into a container, supported by the casing, for collecting the aspirated material, an electric motor to actuate the fan, electric batteries to supply power to the motor through an operating switch. The casing of the drill alternatively comprises an electric socket designed to receive a corresponding plug mounted on the vacuum device so as to supply power to the fan motor by taking it from the power supply of the drill.

26 Claims, 3 Drawing Sheets

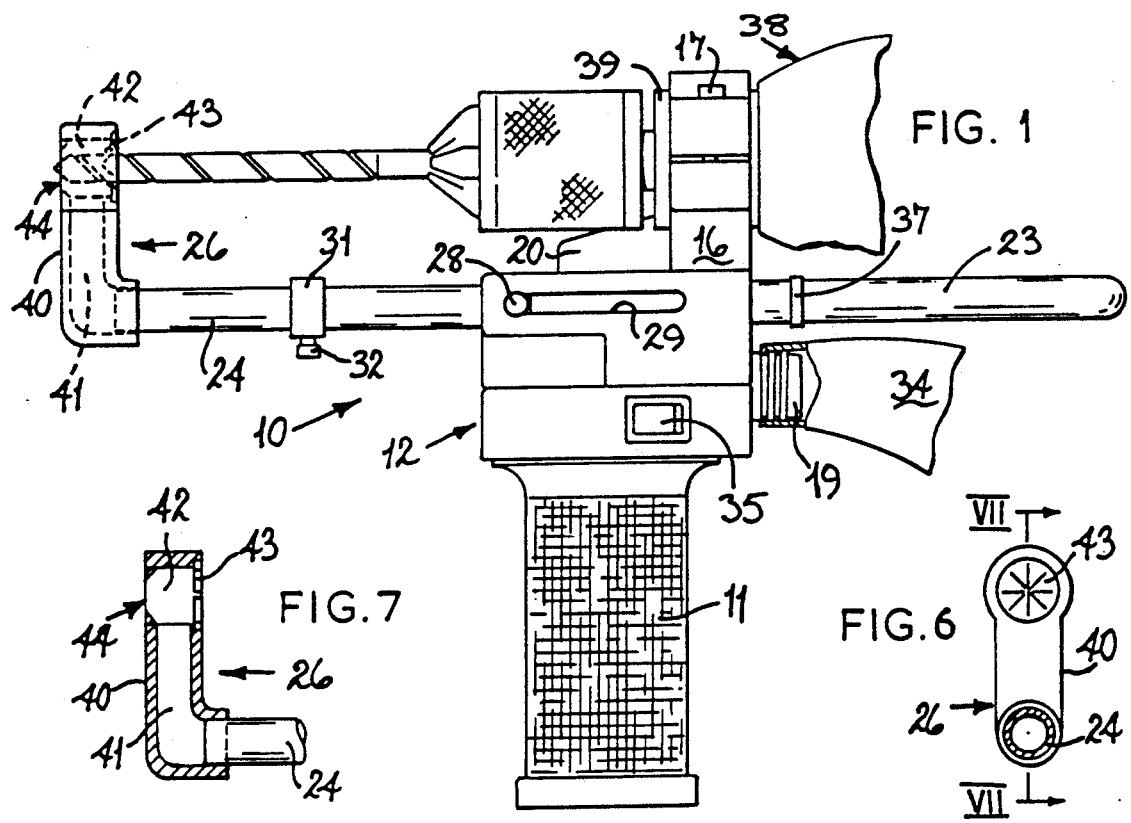
FIG. 1
FIG. 7
FIG. 6
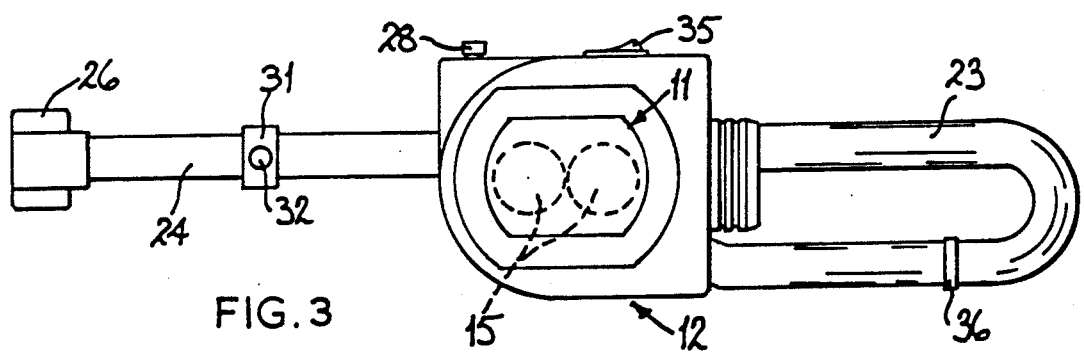
FIG. 3
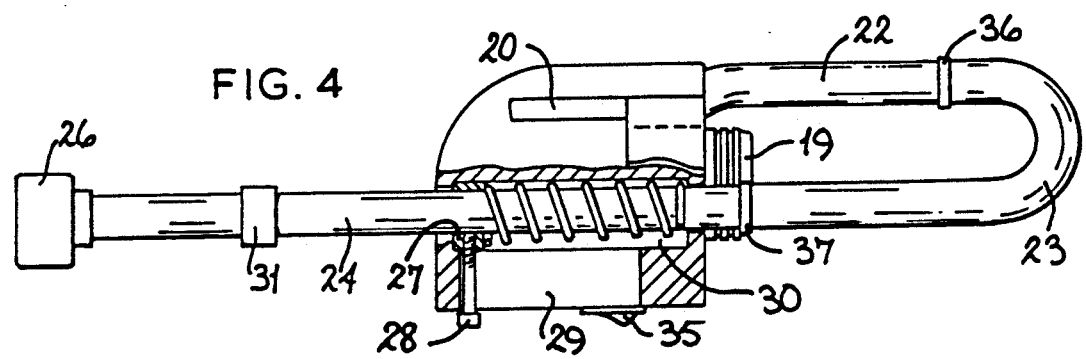
FIG. 4

DUST EXTRACTION FOR DRILL

BACKGROUND OF THE INVENTION

The present invention relates to a handle which is to be secured to a portable drill and which comprises a dust suction device with its suction inlet surrounding the drilling region to prevent the dust and shavings produced during the use of the drill from being dispersed into the environment. The known art includes proposals for various suction devices to be applied to portable drills to remove, through suitable heads, the dust formed directly adjacent to the drilling point.

For example, U.S. Pat. No. 3,850,254 describes a suction device whose rotor is caused to rotate, through a suitable coupling mechanism, directly by the motor rotating the drill arbor. This solution, however, has the disadvantage of low efficiency, owing to the fact that in modern drills the speed of rotation of the arbor is continuously variable over a wide range of values to enable the most diverse types of materials to be drilled, and that consequently the suction device does not always operate at its optimal speed. Furthermore, the casing of the suction device is not shaped to form a handle facilitating the use of the tool, and its overall dimensions are large.

Suction devices comprising a gripping projection to hold the tool firmly have also been proposed, for example as described in U.S. Pats. Nos. 4,097,176 and 4,207,953. In such cases the suction unit is a separate component connected to the said handle and with the suction head positioned in the vicinity of the point to be drilled by means of a flexible duct. This compromises the maneuverability and practicality of operation of the assembly.

SUMMARY OF THE INVENTION

The general purpose of the present invention is to avoid the disadvantages of the know art, by providing a suction device to be secured to a portable drill in the same way as a normal drill handle and comprising a complete suction device with its suction head close to the drilling point. According to a first principle of the invention, the suction device may contain electrical batteries so that it is adaptable to any drill without the requirement for other connections to power sources. Alternarively, according to another principle of the invention, the electrical power of the suction device may be taken from the same source as the drill, suitably prepared, by means of an electrical connection between the handle and the body of the drill.

With this purpose in mind, it was decided to devise, according to the invention a suction device with a casing having means of securing to a portable drill and having a suction head with means of support movable on the casing so that it can be maintained in proximity to the point of penetration into a surface of a body to be drilled by a bit fitted on the drill, in order to suck up the material removed by the bit, characterised in that the said casing has at least one of its portions in the form of a handle which may be gripped and that it comprises in combination a fan with its inlet connected to the said head through a connecting duct and its outlet blowing into a container, supported by the said casing, for collecting the material sucked up, and an electric motor to drive the fan, connected to an electrical power source.

BRIEF DESCRIPTION OF THE DRAWINGS

In order to clarify the explanation of the innovative principles of the present invention and its advantages over the known art, a possible embodiment applying these principles is described below by way of an example, with the aid of the attached drawings. In the drawings:

FIG. 1 represents a side elevation of a dust suction device in the form of a handle, produced in accordance with the present invention and connected to the head of a portable drill;

FIG. 3 represents a plan view from beneath the device shown in FIG. 1;

FIG. 4 represents a plan view from above, partially cut along the line IV—IV in FIG. 2;

FIG. 6 represents a rear view of an example of a suction head used in the device shown in FIG. 1;

FIG. 7 represents a section along the line VII—VII in FIG. 6;

DETAILED DESCRIPTION OF THE PREFERRED EMBODIMENTS

Figure 5:
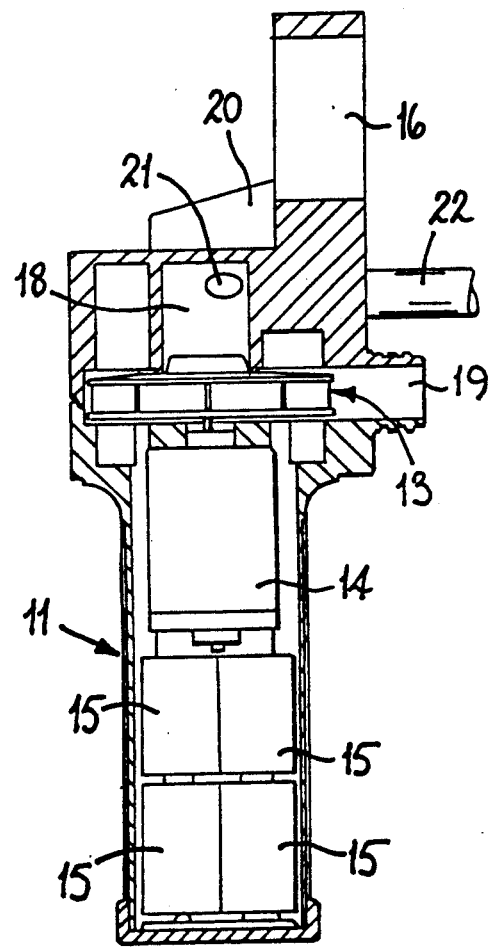
FIG. 5 represents a view partially cut along the line V—V in FIG. 2.

With reference to the figures, a suction device, indicated in a general way by 10, comprises a handle end which may be gripped and is a downward extension of a casing 12 forming a housing and volute (as clearly seen in FIG. 5) for a rotor 13 fixed on the rotating shaft of an electric motor supplied from a set of electric batteries (which may advantageously be of the rechargeable type) through an ignition switch 35.

Figure 2:
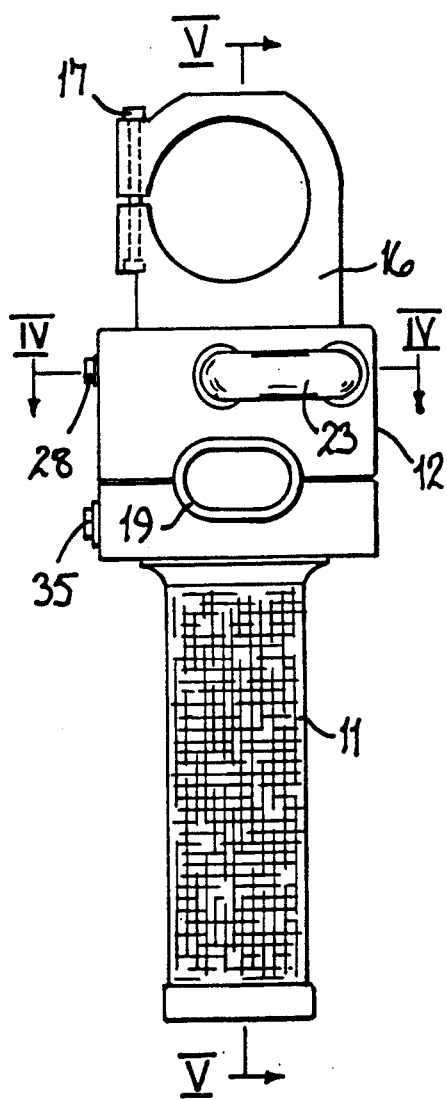
FIG. 2 represents a rear elevation of the device shown in FIG. 1.

Above the casing 12, and supported by a reinforcing web 20, there is a collar element 16, as seen clearly in FIG. 2, which is in the general shape of a "C" with its open ends connected by a securing screw 17 with its head projecting upwards.

The internal volute shape of the casing 12 and the rotor 13 within it form a fan, according to the known art, which sucks axially from one chamber 18 and blows laterally through a duct 19.

Chamber 18 is extended through a hole 21 into a duct 22 which in turn is connected through a flexible duct bent ±nto a U-shape 23, with joints 36 and 37, to a rigid duct 24 arranged so that it can slide against the action of a compression spring 25 in a seat 30 formed in the body 12, as shown in FIG. 4.

The terminal end of the duct 24 is connected at a right angle to a suction head 26 consisting, as also seen more clearly in FIGS. 6 and 7, of a lateral L-shaped end engaging with the anterior end of the duct 24 to couple it through a passage 41 to a chamber 42 which is open at the front to form a suction inlet 44. In order to enhance the suction in the anterior direction, the end of chamber 42 opposite the inlet 44 may advantageously be substantially closed by an elastic membrane 43 made of a pliable material (for example, silicone rubber) having (as clearly shown in FIG. 6) radial slits in the form of a star.

The length of the part of duct 24 projecting in front of the casing 12 is determined by a first adjustable stop ring 27 slideably keyed within the seat 30 to the duct so that it may be locked to it by the tightening of a screw 28 projecting from the casing 12 through a slot 29 parallel to the duct 24. The extension of the slot 29 also determines the maximum rearward distance through which this duct can slide.

A second adjustable stop ring 31 is positioned so that it is axially slideable outside the casing 12 on the duct 24 and can be locked to the duct by a screw 32.

The outlet duct 19 has a coupling end with its external surface circumferentially profiled to form a holder for a collecting bag 34, partially shown in figure 1, which is locked on to it.

As also shown in FIG. 1, the front of the dust suction device 10 may be secured to the head of a portable drill 38 (partially illustrated as it may be of any known type) by fitting the collar 16 over a cylindrical part 39 of the drill which is normally present for the securing of accessories such as conventional handles. In this way the suction inlet 16 becomes coaxial with the axis of the drill arbor. The tightening of screw 17 tightens the collar by bringing together the two ends of the C, so that the device 10 is locked to the drill.

As shown schematically by the broken lines in FIG. 1, when a bit is inserted into the drill arbor the bit is axially located in the chamber 42, penetrating into it by the incurving of the star-shaped flaps of the membrane 43. In this way, the membrane forms a substantial obstacle to the passage of air through the entry point of the bit into the chamber 42, while permitting the insertion of drill bits of different diameters. Naturally, the pliable material of which the membrane is made must be of a type which is capable of withstanding for a certain period, without substantial damage, the abrasive action generated by a drill bit rotating in it.

The connection between the duct 24 and the head 26 may be in rotatable form, so that it permits the rotation of the head about the axis of the duct in such a way as to enable it to be removed from the axis of the drill bit whenever it may be desirable temporarily to dispense with the use of the suction device in the handle and to have a clear space around the drilling area.

During the use of the device, the stop 27 may be positioned and locked to the duct 24 by tightening the screw 28 so that the compression spring 25, when uncompressed, keeps the head 26 close to the end of the drill bit placed in the drill arbor, in such a way that, when the bit is pressed against the surface to be drilled, the head 26 is pressed against this surface and surrounds the end of the bit.

When the drill is starred, as the bit penetrates into the surface to be drilled, the head 26 is pushed backwards as a result of its contact with the surface to be drilled, causing the duct 24 to slide backwards in its seat 30 against the action of the spring 25, simultaneously bending the U-shaped connecting duct 23 so that its two arms slide with respect to each other and remain substantially parallel.

Thus the head 26 always remains in contact with the surface, sucking up the dust and shavings as they are produced by the bit, and passing them through the ducts 4,23,22 and the suction fan to the collecting bag 34. By fixing the stop 31 in the desired axial position, it is possible to set the maximum rearward distance through which the duct slides at a value lower than that permitted by the extent of the slot 27 and the length of the seat 30. In this way the head 26 may also be used as a drilling depth regulator.

Figure 8:
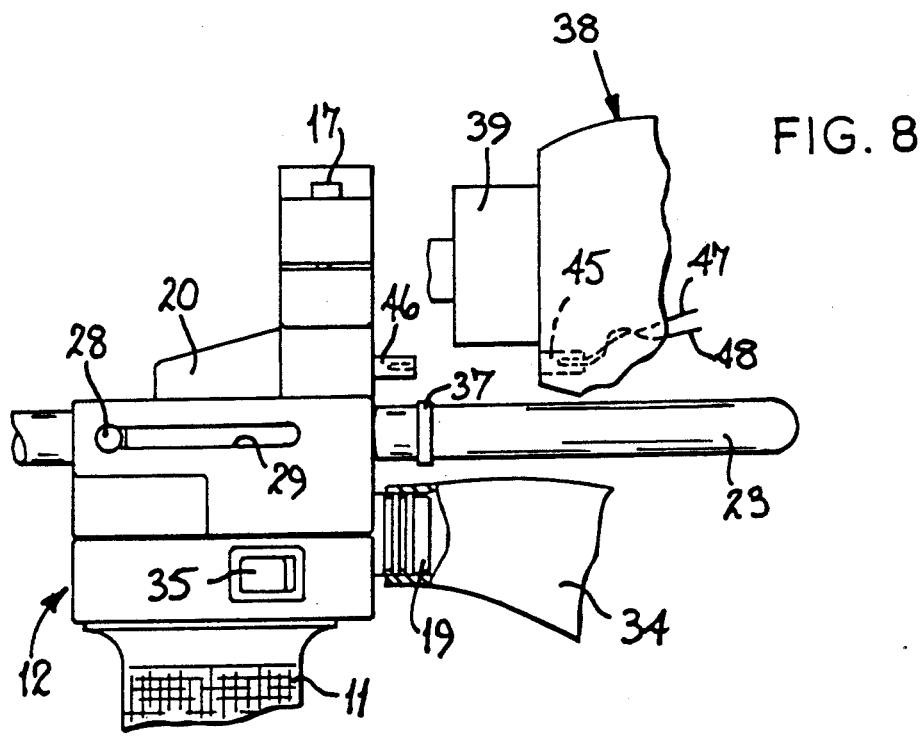
FIG. 8 represents a partial side elevation of a possible variation of a device produced according to the invention.

A possible variation of the embodiment described above is shown in FIG. 8. As seen in this figure, the casing of the drill 38 may be provided with a socket 45 to receive a plug 46 on the casing of the suction device when the suction device is fixed to the drill casing.

Figure 9:
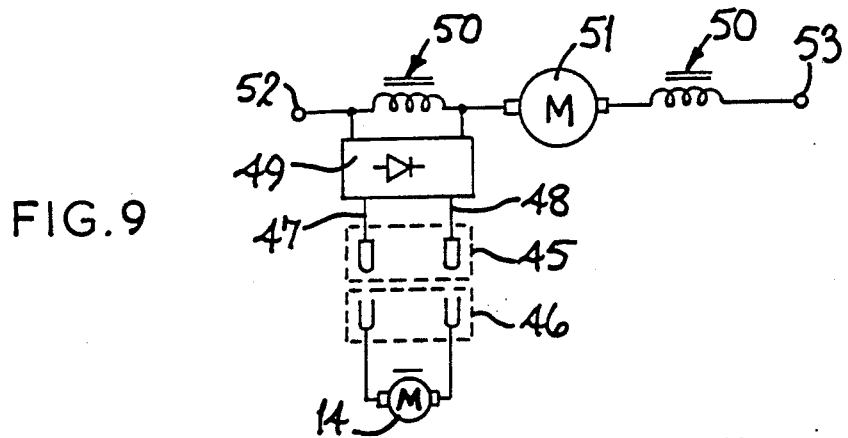
FIG. 9 represents a first electrical circuit diagram for the embodiment in FIG. 8.

The plug 46 is electrically connected to the motor of the suction device, while the socket 45 is connected through electrical wires 47 and 48 to a power supply derived from the supply to the drill. FIG. 9 shows a first example of a circuit for a low voltage direct current supply to the motor 14 of the suction device. As seen in this figure, socket 45 receives a direct current rectified by a rectifier 49 which takes its current in parallel from one of the two stator windings 50 of the motor 51 of the drill 38, which in turn is connected to a power source (such as a normal electrical line of a mains installation) through terminals 52 and 53. Alternatively, as shown schematically in FIG. 10, the rectifier 49 may take the low voltage to be rectified from a supplementary winding 54 electromagnetically coupled to one of the two stator windings 50 so that it forms, in combination with it, a normal voltage transformer, with the advantage, in relation to the solution in FIG. 9, that the supply voltage of the motor 14 may be determined with more freedom at the design stage. With the embodiments shown in FIGS. 9 and 10, therefore, it is possible to produce a handle without supply batteries and consequently with a lower cost and weight.

Naturally, the description of a device applying the innovative principles of the present invention is to be understood as being for the purpose of exemplifying these principles and must not, therefore, be taken as limiting the scope of the patent right claimed herein.

The coupling between the drill and the suction handle according to the present invention may be made either in the form of a serrated ring and screw or in the most suitable shape for the casing of the drill, for example to adapt it to coupling forms and projections normally provided for the mounting of accessories or for the securing of conventional handles.

The supply batteries of the suction device may be of the disposable type or, as already mentioned, rechargeable, with the recharging taking place either outside the suction device, by extracting the batteries from it, or, advantageously, inside the handle so that the batteries do not have to be extracted from the grip. In the last mentioned case, a socket must be provided for the connection of the batteries to an appropriate power source for the recharging supply and, if necessary, for a simultaneous supply to the motor of the suction device. Such a solution may be achieved, as well as with an external power supply unit, for example with the circuits shown in FIGS. 9 and 10, in such a way as to provide mains supply with simultaneous recharging of the batteries in the case of a drill so equipped, so that the handle may subsequently be transferred to a drill without socket 45, on which it will operate from the batteries.

Figure 10:
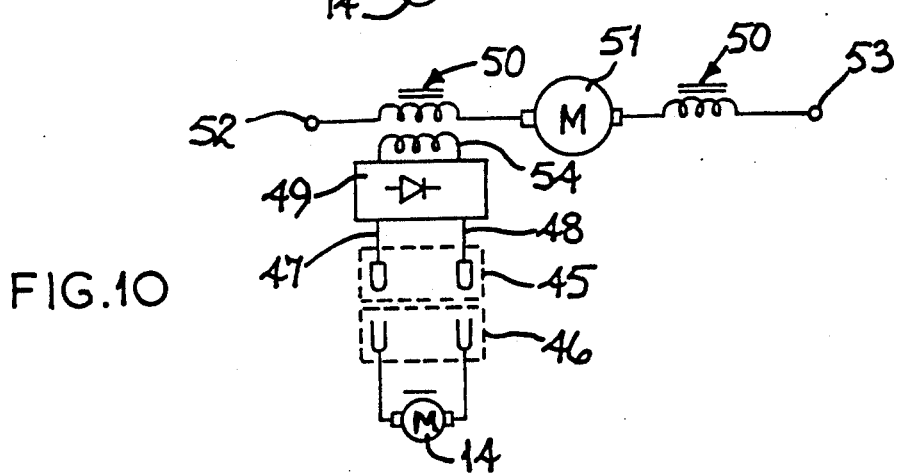
FIG. 10 represents a second electrical circuit diagram for the embodiment in FIG. 8.

Although the circuits in FIGS. 9 and 10 provide for the use of a direct-current motor 14, it is naturally Possible to use alternating-current motors by eliminating the rectifier 49. As an alternative to the assembly of the socket 45 and plug 46 which are directly engaged when the handle is secured, the electrical connection between the handle and the drill may also be made in the form of a flexible electric cable fitted with a plug and emerging from the handle in such a way that it may be easily connected to the suitably equipped drill or, alternatively, to an external power supply unit, as may be easily imagined by an engineer and therefore not described or illustrated further. Although the volute of the suction fan has been illustrated and described as an integral part of the casing 12 and consequently formed with it in one piece, it is naturally possible to produce the fan as a separate part inserted in the casing 12.

Finally, the chamber of the head which axially surrounds the drill bit may be formed so that it is open on one side, in the shape of a "C", to permit the passage of the bit when the head is rotated, as described above, about the axis of the suction duct without the need to move the head away from interference with the drill bit. Such a C-shaped head may advantageously have the open ends of the C extended with membranes made of flexible material and extending towards each other to provide substantial air-tightness while permitting the said rotary movement with the lateral exit of the bit from the chamber, as may easily be imagined by an engineer.

I claim:

1. A suction device, comprising:
   a casing provided with means for securing the casing to a portable drill;
   a suction head with means for movably supporting the suction head on the casing to enable this suction head to be kept close to the point of penetration into the surface of a body to be drilled by a drilling bit mounted on the drill, in order to such up material removed by the bit;
   said casing having at least one portion constituting a handgrip;
   said casing containing a fan having an intake connected to said suction head through a connecting duct and with an outlet blowing into a container, for collecting aspirated material, supported by said casing;
   an electric motor for driving the fan and connected to a source of electrical power;
   said movably supporting means including said connecting duct, said connecting duct being rigid in a section leading off from the suction head, said section sliding in a housing in said casing in a direction parallel to the axial length of said drilling bit, in order to permit the suction head to move parallel to said direction, against he action of a spring, when pressure is exerted upon the suction head by the surface of the body to be drilled;
   the suction head comprising a suction mouth substantially disposed to slidingly surround the drilling bit over an axial section of the latter;
   said mouth forming a chamber which is traversed by the drilling bit and closed at the end opposite the surface of the body to be drilled by an element which substantially prevents the passage of air through said closed end into the chamber; and
   said element being made in the form of a flexible diaphragm having star-shaped slits defining flaps which bend to enable said diaphragm to be centrally penetrated by the drilling bit.

2. Suction device as claimed in claim 1, wherein the duct comprises a flexible section between said rigid section and the intake of the fan.

3. A suction device, comprising:
   a casing provided with means for securing the casing to a portable drill;
   a suction head with means for movably supporting the suction head on the casing to enable the suction head to be kept close to the point of penetration into the surface of a body to be drilled by a drillin bit mounted on the drill, in order to such up material removed by the bit;
   said casing having at least one portion constituting a handgrip;
   said casing contaning a fan having an intake connected to said head through a connecting duct and with an outlet blowing into a container for collecting aspirated material;
   said container being supported by said casing;
   an electric motor for driving the fan and connected, in use, to a source of electrical power;
   said movably supporting means comprising a rigid section of said duct slidable in the casing in a direction parallel to said drilling bit;
   said duct comprising a flexible section between said rigid section and the intake of the fan;
   the flexible section being bent generally in the form of a U with arms substantially parallel to each other and to the sliding direction of the rigid section; and
   said arms moving reciprocally relative to each other by shifting the bending point between them when the rigid section slides in the housing.

4. Suction device as claimed in claim 3, wherein the means securing the head to the drill comprise a generally C-shaped collar element which extends above the casing and fits into a complementary housing in the drill and is provided with a screw disposed between the two free ends of the C to bring them together and tighten the collar around the housing when the screw is tightened.

5. Suction device as claimed in claim 3, wherein the suction head comprises a suction mouth substantially disposed to slidingly surround the drilling bit over an axial section of the latter.

6. Suction device as claimed in claim 3, wherein the suction head comprises a suction mouth substantially disposed to slidingly surround the drilling bit over an axial section of the latter and the mouth forms a chamber which is traversed by the bit and closed at the end opposite the surface of the body to be drilled by an element which substantially prevents the passage of air from the inlet aperture of the bit into the chamber.

7. Suction device as claimed in claim 3, wherein the source of power comprises electric batteries disposed inside the suction device and connected to the motor by means of an operating switch disposed on the outer 8. Suction device as claimed in claim 3, wherein the electric batteries are of the rechargeable type.

9. Suction device as claimed in claim 3, comprising an electric plug connected to the fan motor designed to be connected to a source of power disposed outside the device.

10. Suction device as claimed in claim 9, wherein said external source of power is available on a socket disposed on the casing of the drill connected to the suction device.

11. Suction device as claimed in claim 9, wherein the plug is fitted on the handgrip and is automatically plugged into a socket disposed on the casing of the drill in relation to the position of the suction device on the drill.

12. Suction device as claimed in claim 9, wherein the plug on the handgrip is disposed at the end of a flexible electric cable and is manually plugged into a socket disposed on the casing of the drill.

13. Suction device as claimed in claim 9, wherein a socket on the casing of the drill arranged to connect the fan motor to a source of power is internally connected in parallel to a stator winding of the motor of the drill in order to supply external power which is a fraction of the voltage supplied to the drill.

14. Suction device as claimed in claim 9, wherein a socket on the casing of the drill arranged to connect the fan motor to a source of power is internally connected to an electrical winding which is electromagnetically coupled to a stator winding of the motor of the drill in order to form with the latter a voltage transformer and to supply external power which is a fraction of the voltage supplied to the drill.

15. Suction device as claimed in claim 9 wherein a socket arranged to connect the fan motor to a source of power is disposed in series with a voltage rectifier so as to provide an external direct current power supply when the drill is powered by alternating current, the electric motor driving the fan being powered by direct current.

16. A suction device for a portable power drill, comprising:
an auxiliary handle having a handgrip portion at an outer end and a releasable clamping collar at an inner end;
said releasable clamping collar having means for tightening and loosening said collar to enable said collar to be readily attached to or released from a forward portion of the portable drill;
a suction head for surrounding a drill bit carried and driven by the portable power drill;
a suction fan mounted in said auxiliary handle together with an electric motor drivingly connected to said fan, said suction fan having an inlet and an outlet;
a switch mounted on said auxiliary handle for switching said motor on and off independently of operation of the portable drill to drive said drill bit;
a conduit connecting said suction head to said fan inlet;
a debris collection receptacle connected to said fan outlet; and
said auxiliary handle together with said suction head, said suction fan, said electric motor, and said debris collection receptacle being removable as a unit from the portable drill by loosening said tightening means.

17. The suction device of claim 16, further comprising:
a battery compartment in said auxiliary handle; and
at least one battery in said battery compartment for powering said motor.

18. The suction device of claim 17, wherein:
said fan is disposed in a housing located between said handgrip portion and said clamping collar, said housing having said fan inlet and said fan outlet;
said motor is mounted in said handgrip portion adjacent said fan; and
said battery compartment is located in said handgrip portion between said motor and an outer end of said handgrip portion.

19. The suction device of claim 16, wherein said conduit comprises two spaced apart parallel rigid sections connected by a flexible section bent generally in the form of a U.

20. The suction device of claim 19, wherein one of said rigid sections is slidably supported by said auxiliary handle and supports at an end said suction had.

21. A suction device and a portable power drill combination, wherein:
the electric drill has a housing, a drive motor in said housing, and a drill arbor extending forwardly from a forward part of said housing;
the suction device comprises an auxiliary side handle connected to a suction head by a connecting duct;
said side handle has means for releasably mounting said side handle to said housing forward part;
said side handle contains a fan having a suction inlet connected to said connecting duct;
said side handle contains an auxiliary electric motor drivingly connected to said fan; and
a switch is mounted on said side handle for energizing said auxiliary electric motor independently of energization of said electric drill drive motor.

22. The combination of claim 21, wherein said side handle contains at least one battery for energizing said auxiliary electric motor via said side handle switch.

23. The combination of claim 21, wherein:
said connecting duct has a rigid portion slidably supported by said side handle and carrying said suction head; and
an adjustable stop is located on said rigid portion, said stop engaging said side handle during drilling by said electric drill to function as a drilling depth regulator.

24. The combination of claim 21, wherein:
said connecting duct has a first rigid portion mounted slidably relative to said side handle, a flexible portion bent in the form of a U, and a second rigid portion, said flexible portion being connected between said first and second rigid portions and allowing movement of said first rigid portion relative to said second rigid portion; and
a spring is disposed to act between said side handle and said first rigid portion to resiliently urge said suction head forwardly away from said side handle.

25. The combination of claim 21, wherein said releasable mounting means comprises a clamping collar with a tightening screw.

26. The combination of claim 21, wherein said fan has an outlet, and a collecting bag is attached to said outlet.

* * * * *

UNITED STATES PATENT AND TRADEMARK OFFICE
CERTIFICATE OF CORRECTION

PATENT NO.  : 5,090,499

DATED       : February 25, 1992

INVENTOR(S) : CUNEO

It is certified that error appears in the above-identified patent and that said Letters Patent is hereby corrected as shown below:

On the Title page, item [56], "References Cited, please add the following:

```
-- FOREIGN PATENT DOCUMENTS
   2741536  3/79   Germany
   2925908  1/81   Germany
   3516099 11/86   Germany  --
```

In Claim 1:  at column 5, line 33, change "such" to -- suck --
at column 5, line 50, change "he" to -- the --

In Claim 3:  at column 6, line 6, change "drillin" to -- drilling --
at column 6, line 7, change "such" to -- suck --

In Claim 7:  at column 6, line 53, after "on the outer" insert
-- surface of the device itself. --

In Claim 16: between lines 47 and 48 before the subparagraph beginning "a debris collection receptacle" insert the following subparagraph:
-- wherein said conduit comprises two spaced apart parallel rigid sections connected by a flexible section bent generally in the form of a U and one of said rigid sections is slideably supported by said auxiliary handle and supports at an end said suction head; --

Cancel Claim 19.

Cancel Claim 20.

UNITED STATES PATENT AND TRADEMARK OFFICE
CERTIFICATE OF CORRECTION

PATENT NO. : 5,090,499

DATED : February 25, 1992

INVENTOR(S) : CUNEO

It is certified that error appears in the above-identified patent and that said Letters Patent is hereby corrected as shown below:

In Claim 21: at column 8, between lines 22 and 23, insert the following subparagraph:
-- said connecting duct has a first rigid portion mounted slideably relative to said handle, a flexible portion bent in the form of a U, and a second rigid portion, said flexible portion being connected between said first and second rigid portions and allowing movement of said first portion relative to said second rigid portion; --

In Claim 24: at column 8, delete lines 44 to 50 in their entirety.

Signed and Sealed this

Twentieth Day of July, 1993

Attest:

MICHAEL K. KIRK

*Attesting Officer*   *Acting Commissioner of Patents and Trademarks*